US006616390B1

(12) United States Patent
Feilner

(10) Patent No.: US 6,616,390 B1
(45) Date of Patent: Sep. 9, 2003

(54) STRUCTURAL MEMBER HAVING A NUT WITH AN EXTENDED FLANGE

(76) Inventor: Marcus Feilner, Gleissenberg 31, D-96152 Burghaslach (DE)

( * ) Notice: Subject to any disclaimer, the term of this patent is extended or adjusted under 35 U.S.C. 154(b) by 0 days.

(21) Appl. No.: 10/048,629

(22) PCT Filed: Aug. 2, 2000

(86) PCT No.: PCT/DE00/02557
§ 371 (c)(1),
(2), (4) Date: Apr. 26, 2002

(87) PCT Pub. No.: WO01/09449
PCT Pub. Date: Feb. 8, 2001

(30) Foreign Application Priority Data

Aug. 3, 1999 (DE) ..................................... 299 13 228 U
Apr. 10, 2000 (DE) ..................................... 200 06 411 U

(51) Int. Cl.[7] .......................... F16B 37/00; F16B 39/284
(52) U.S. Cl. ....................... 411/104; 411/156; 411/186; 411/427; 411/917
(58) Field of Search ................... 411/104, 155, 411/156, 177, 180, 185, 186, 187, 435, 917, 427

(56) References Cited

U.S. PATENT DOCUMENTS

| 1,037,384 | A | * | 9/1912 | White .................. 411/155 |
| 2,314,756 | A | * | 3/1943 | Bedford, Jr. ............ 411/435 X |
| 2,394,491 | A | | 2/1946 | Schaper |
| 2,654,923 | A | * | 10/1953 | Johnson ................ 411/104 X |
| 2,945,524 | A | | 7/1960 | Becker |
| 3,192,981 | A | * | 7/1965 | Oliver .................. 411/104 X |
| 3,198,229 | A | | 8/1965 | Beltoise |
| 4,145,794 | A | * | 3/1979 | Schenk ................. 411/104 X |
| 5,407,311 | A | * | 4/1995 | Goss ...................... 411/180 X |
| 5,934,855 | A | | 8/1999 | Osterle et al. |

FOREIGN PATENT DOCUMENTS

| DE | 35 12 782 | 10/1986 |
| DE | 90 10 431 | 9/1990 |
| DE | 43 42 261 | 6/1995 |

* cited by examiner

Primary Examiner—Neill Wilson
(74) Attorney, Agent, or Firm—Venable LLP; Robert Kinberg; Chad C. Anderson

(57) ABSTRACT

A nut includes an extended flange and a center hole. A shoulder is formed onto the edge of the center hole to achieve an easier and faster assembly. The shoulder has an essentially tubular shape and is provided with a thread on its inside wall.

10 Claims, 4 Drawing Sheets

STRUCTURAL MEMBER HAVING A NUT WITH AN EXTENDED FLANGE

BACKGROUND OF THE INVENTION

The invention relates to a structural member comprising a nut having an extended flange, a center hole and a shoulder formed integrally onto its edge.

A structural member of this type can be used, for example, for distributing the force of a screw or a nut over a larger surface of a body, as shown in the DE 43 42 261 C 2. With this known structural member, the shoulder takes the form of a cavity for accommodating the head of a screw extending through the center hole. A structural member of this type is preferably used for attaching one or several courses of roofing paper or an insulation material to a solid understructure.

The known structural member is not suitable for a frictional connection of rigid structural parts, for example wooden beams for a roof truss or wooden boards for manufacturing furniture.

A workman using this known structural member for screwing together two bodies, for example, must furthermore push the screw through holes in the bodies, must then use a washer and must finally attach a nut to the end of the screw and hold this nut while turning the screw. This type of handling is very cumbersome and time consuming. In addition, the nut and the washer are relatively expensive. The assembly can be simplified by attaching the nut to the washer, e.g. welding it on. However, this further increases the cost of production.

BRIEF SUMMARY OF THE INVENTION

It is an object of the invention to create a structural member of the aforementioned type, which can be mounted faster and easier and is cheaper to produce than a nut and washer that may be welded to it.

This object is solved with the structural member of the present invention in which a shoulder is designed to have an essentially tubular shape with a thread on its inside wall.

According to one advantageous modification of the invention, the structural member is provided with a curvature in the shape of a cylindrical wall, the axis of which extends perpendicular to the symmetry axis of the thread.

The structural member may have a dome-shaped curvature, so that the structural member can be used for screwing together two bodies, for example two hollow tubes or two wooden parts. For this, the connecting elements remain inside the hollow tubes or inside two bores in the wooden parts, such that they are not visible from the outside.

According to another advantageous modification of the invention, the outside wall of the tubular shoulder is shaped suitable for engaging a tool, preferably has a hexagonal shape, so that a tool can be used to screw a threaded bolt into the thread of the structural member.

Another variant furthermore provides that the shape of the edge of the dome-shaped, curved nut is suitable for a tool engagement and preferably has meandering notches.

The tubular shoulder can be located on the concave side of the curvature for an invisible countersinking of the structural member inside a bore on the front of a rafter when screwing together a wooden beam and a rafter that is planed, for example, on three sides.

Other advantageous modifications of the invention are disclosed herein.

The advantages achieved with the invention in particular are that the structural member can be mounted easier and faster than two separate parts, such as the nut and washer. Furthermore, the production costs are less, for example, than for a nut welded to a washer. In addition, there is no waste because there is no chip-removing processing, which additionally helps lower the costs and protect the environment.

The drawing shows two exemplary embodiments of the invention, which are described in further detail in the following. Shown are in:

DETAILED DESCRIPTION OF THE INVENTION

Figure 1:
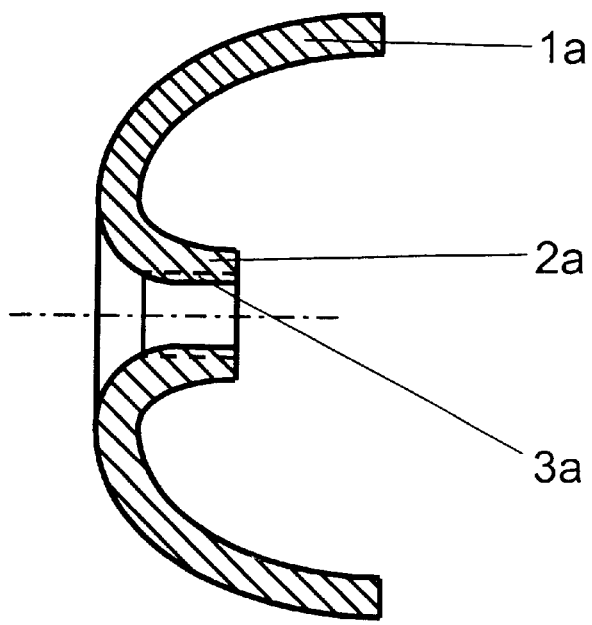
FIG. 1 shows a sectional view of a structural member with curved flange, with a shoulder on the concave side, crosswise to the curvature axis.
Figure 2:
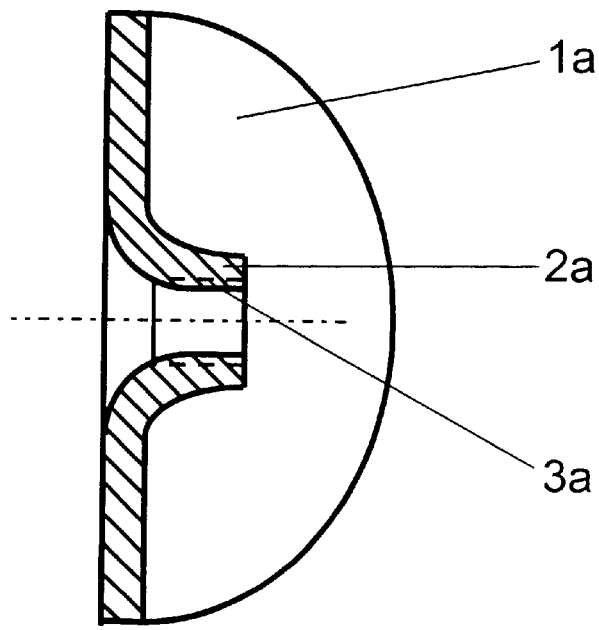
FIG. 2 shows a sectional view of this structural member along its axis of curvature.
Figure 7:
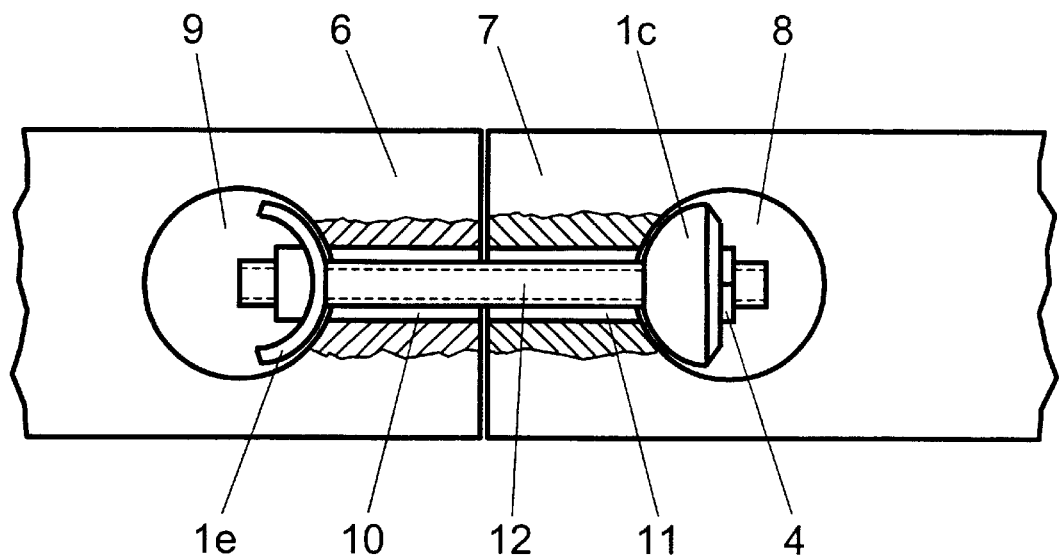
FIG. 7 shows a view from above, in part sectional, of two wooden parts, screwed together with the aid of the structural members.
Figure 8:
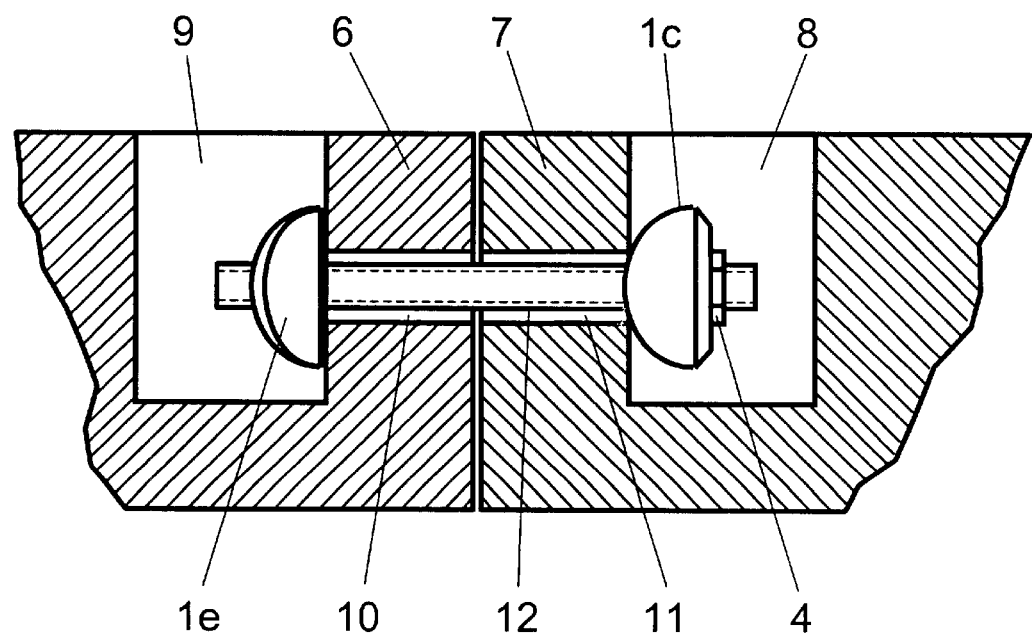
FIG. 8 shows a longitudinal section through the screwed-together wooden parts according to FIG. 7, showing a view of the connecting elements.

A structural member according to FIGS. 1 and 2 includes a nut with a curved flange 1a and a center hole. An essentially tubular shoulder 2a, for example produced with the deep-drawing technique, is integrally formed onto the edge of the center hole and extends on the concave side of the curvature. The inside wall of shoulder 2a has a thread 3a, produced with the rolling technique to increase the tensile strength. The convex side of this type of structural member can engage with a concave, curved surface, for example inside a blind hole 8, as shown in FIGS. 7 and 8.

Figure 3:
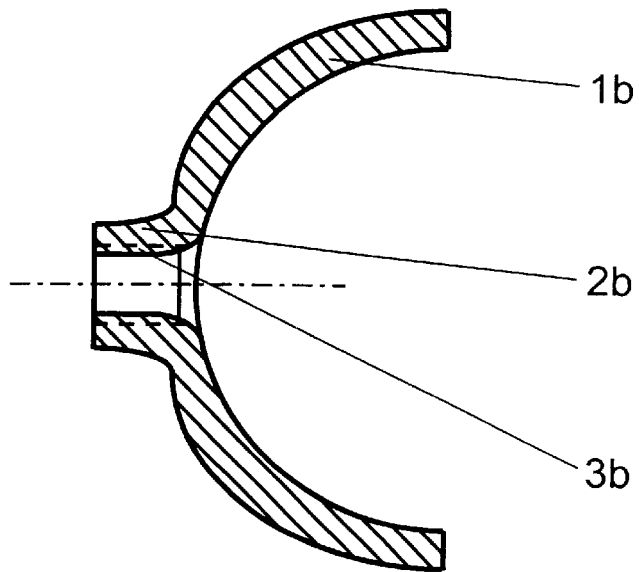
FIG. 3 shows a sectional view of a structural member with a curved flange and a shoulder on the convex side, crosswise to its axis of curvature.
Figure 4:
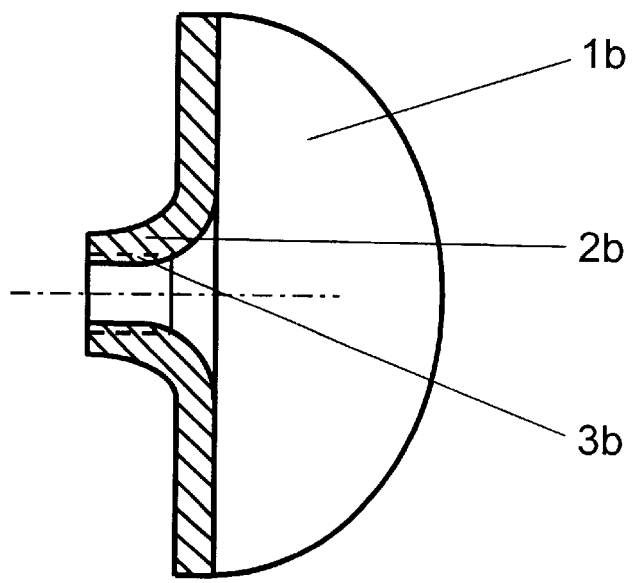
FIG. 4 shows a sectional view of this structural member along its axis of curvature.

The structural member according to FIGS. 3 and 4 include a nut with a curved flange 1b and a center hole. An essentially tubular shoulder 2b integrally formed onto the edge of this hole, wherein the shoulder extends along the convex side of the curvature. The inside wall of the shoulder 2b is also provided with a thread 3b. This type of structural member can fit with its concave side around a convex, curved surface, for example around a pipe or round wood, which must be screwed together with other bodies.

Figure 5:
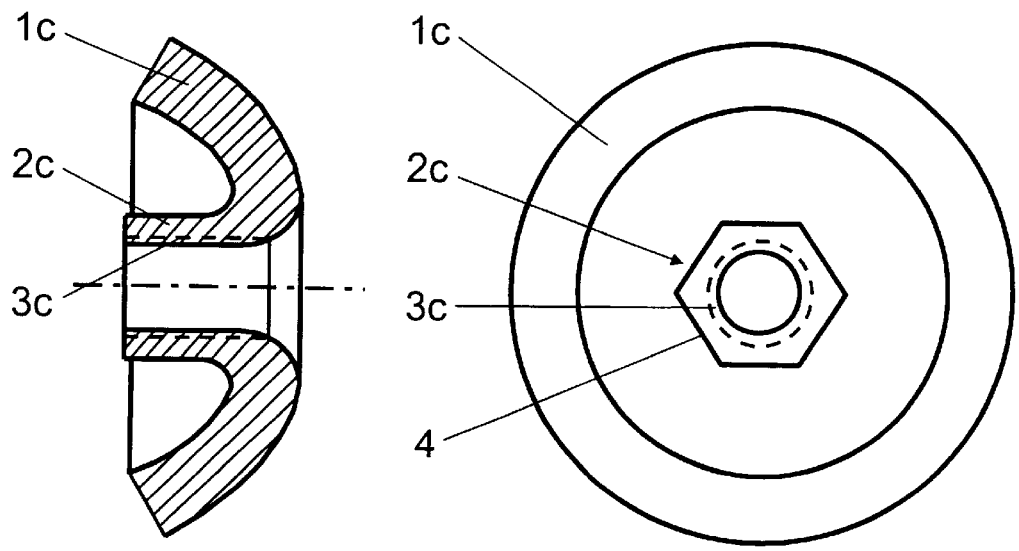
FIG. 5 shows a sectional view and a view from above of a structural member, with a first alternative for engaging a tool.
Figure 6:
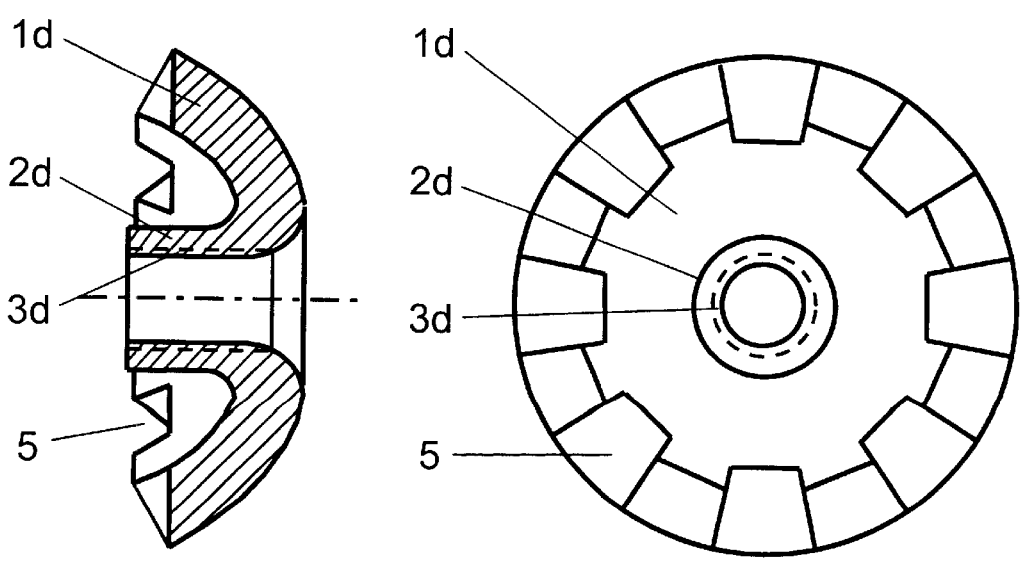
FIG. 6 shows a sectional view and a view from above of a structural member, with a second alternative for engaging a tool.

The structural member according to FIGS. 5 and 6 include a nut with a flange 1c having a dome-shaped curvature, a center hole and an essentially tubular shoulder 2c formed onto the edge of this hole. The shoulder is produced, for example, with the deep-drawing technique and extends along the concave side of the curvature. The inside wall of shoulder 2c is provided with a thread 3c that is produced with the rolling technique to increase the tensile strength. This type of structural member can engage with its convex side in a concave, curved surface, for example inside a hollow space or a blind hole 9 in a wooden part, as shown in FIGS. 7 and 8.

The outside wall of tubular shoulder 2c for the structural member according to FIG. 5 is provided with a hexagonal shape 4, suitable for engaging a corresponding socket wrench for turning the structural member.

The structural member according to FIG. 6, on the other hand, is provided with meandering notches 5 along the edge of the dome-shaped, curved flange 1, which respectively function to engage a tool for turning the structural member.

FIGS. 7 and 8 show an exemplary embodiment for screwing together two wooden parts 6, 7 with the aid of the structural members according to the invention. Each of the wooden parts 6, 7 has a blind hole 8, 9 with a diameter of 30 mm, for example, wherein respectively one bore 10, 11 extends crosswise to the blind holes 8, 9. A threaded bolt 12 is fitted through these blind holes and can be screwed with one end into the thread of a structural member according to FIGS. 1 and 2. The structural member is inserted into the blind hole 9 of the wooden part 6, shown on the left side, and is provided with a nut having an extended flange 1e with cylinder-shaped curvature that fits flush against the inside wall of blind hole 9, thus preventing a turning of the structural member 1e.

Once the two wooden parts 6, 7 are joined, the structural member 14 according to FIG. 5 can be inserted into the blind hole 8 of the wooden part 7, shown on the right, and can be screwed to the other end of the threaded bolt 12 and tightened with a tool, which is a socket wrench in this case. The blind holes 8, 9 can be closed with wooden plugs that are not shown herein, so that the connecting elements are not visible from the outside.

What is claimed is:

1. A structural member, comprising:
   a nut defining a threaded bore; and
   an extended flange integrally formed with said nut, wherein the flange has a dome-shaped curvature with a convex surface adaptable to transmit force.

2. The structural member of claim 1, wherein the nut has an outside wall with a hexagonal shape for engaging a tool.

3. The structural member of claim 1, wherein the flange has an edge portion with meandering notches for engaging a tool.

4. The structural member of claim 1, wherein the curvature of the flange has a concave side, the nut being formed onto the concave side of the flange.

5. The structural member of claim 1, wherein the curvature of the flange has a convex side, the nut being formed onto the convex side of the flange.

6. The structural member of claim 1, wherein the nut and flange are produced by a deep-drawing technique.

7. The structural member of claim 1, wherein the threaded bore is produced with a rolling technique.

8. The structural member of claim 1, further comprising a non-rust metal coating deposited by electroplating.

9. A method of screwing together two bodies, each provided with a blind hole, utilizing at least two structural members of claim 1 in combination with a threaded bolt, wherein the convex surfaces of the flanges frictionally engage an inside surface of the blind holes.

10. A method of screwing together two bodies, each provided with a blind hole, utilizing the structural member of claim 1 as a first structural member in combination with a threaded bolt and a second structural member,
    wherein the second structural member comprises a nut with a threaded bore and an extended flange formed on one edge of the bore, the flange of the second structural member having a cylindrical-shaped curvature and a convex surface adapted to transmit force, and
    wherein the convex surfaces of the flanges of the first and second structural members frictionally engage an inside surface of the blind holes.

* * * * *